(12) United States Patent
Meng

(10) Patent No.: US 6,404,270 B1
(45) Date of Patent: Jun. 11, 2002

(54) SWITCHED WELL TECHNIQUE FOR BIASING CROSS-COUPLED SWITCHES OR DRIVERS

(75) Inventor: Anita Meng, Milpitas, CA (US)

(73) Assignee: Cypress Semiconductor Corp., San Jose, CA (US)

( * ) Notice: Subject to any disclaimer, the term of this patent is extended or adjusted under 35 U.S.C. 154(b) by 0 days.

(21) Appl. No.: 09/723,494

(22) Filed: Nov. 28, 2000

(51) Int. Cl.[7] .................................................. H03K 3/01
(52) U.S. Cl. ...................................................... 327/534
(58) Field of Search .................................. 327/530, 534, 327/535, 536, 537

(56) References Cited

U.S. PATENT DOCUMENTS

| | | | | |
|---|---|---|---|---|
| 5,172,013 A | * | 12/1992 | Matsumura | 307/296.2 |
| 5,448,198 A | * | 9/1995 | Toyoshima et al. | 327/530 |
| 5,608,344 A | * | 3/1997 | Marlow | 327/206 |
| 5,874,850 A | * | 2/1999 | Pulvirenti et al. | 327/536 |
| 6,072,357 A | * | 6/2000 | Jo | 327/536 |
| 6,240,025 B1 | * | 5/2001 | Park | 365/189.09 |
| 6,259,310 B1 | * | 7/2001 | Kawamura | 327/536 |

OTHER PUBLICATIONS

Floating–Well Charge Pump Circuits for Sub–2.0V Single Power Supply Flash Memories, By Ki–Hwan Choi et al., 1997, Symposium on VLSI Circuits Digest of Technical Papers, pp. 61–62.

Low Supply Voltage CMOS Charge Pumps, By Jieh–Tsorng Wu et al., 1997 Symposium on VLSI Circuits Digest of Technical Papers, pp. 81–82.

MOS Charge Pumps for Low–Voltage Operation, By Jie-h–Tsorng Wu et al., IEEE Journal of Solid–State Circuits, vol. 33, No. 4, Apr. 1998, pp. 592–597.

A New Charge Pump Without Degradation in Threshold Voltage Due to Body Effect, By Jongshin Shin et al., IEEE Journal of Solid–State Circuits, vol. 35, No. 8, Aug. 2000, pp. 1227–1230.

* cited by examiner

Primary Examiner—Jeffrey Zweizig
(74) Attorney, Agent, or Firm—Christopher P. Maiorana, P.C.

(57) ABSTRACT

An apparatus comprising a circuit that may be configured to generate an output in response to a first and a second input. The circuit may be automatically biased in response to the first and second inputs.

20 Claims, 8 Drawing Sheets

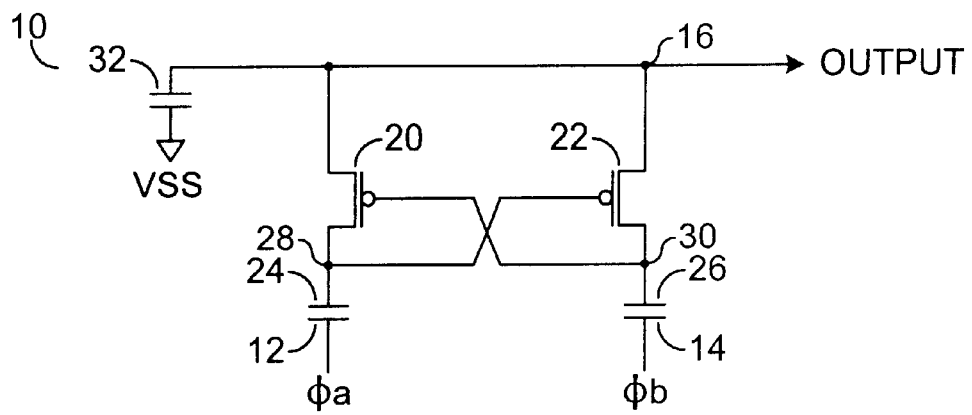
(CONVENTIONAL)
FIG. 1a
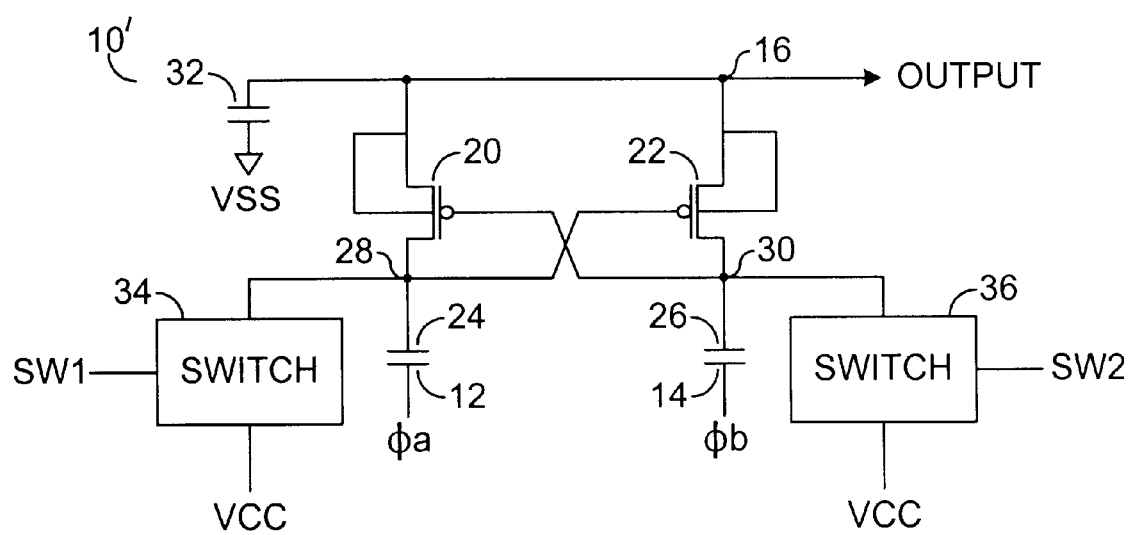
(CONVENTIONAL)
FIG. 1b

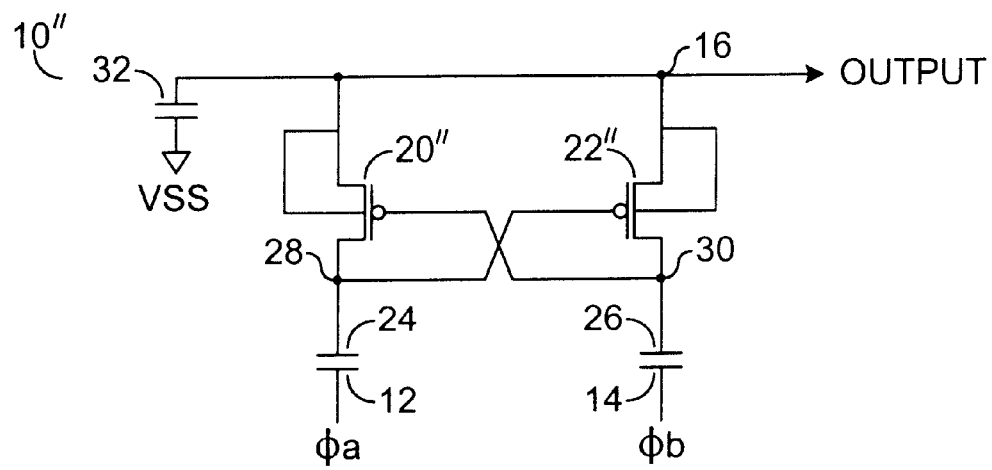
(CONVENTIONAL)
FIG. 1c
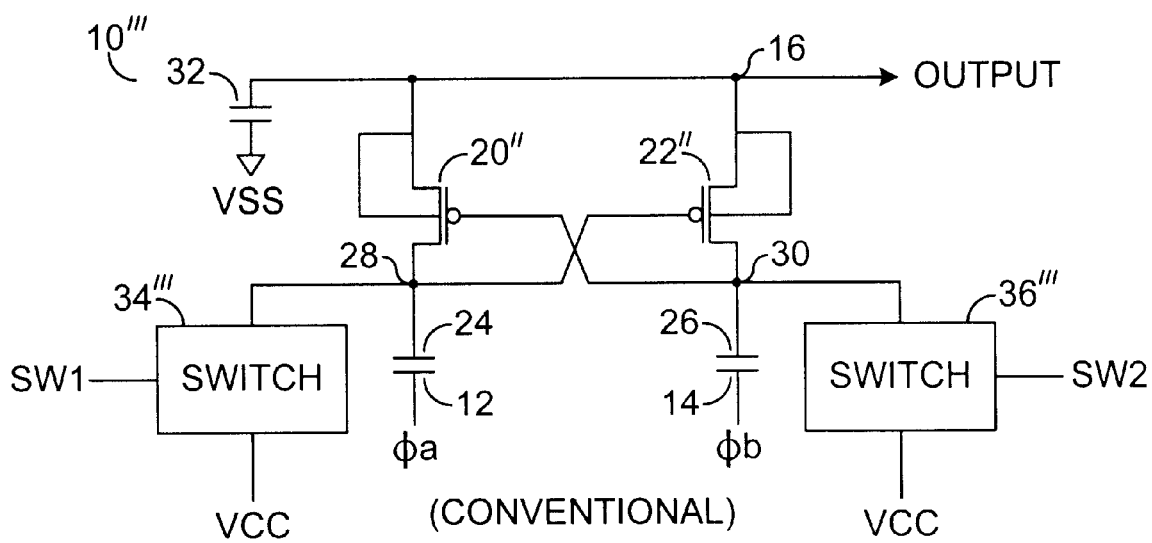
(CONVENTIONAL)
FIG. 1d

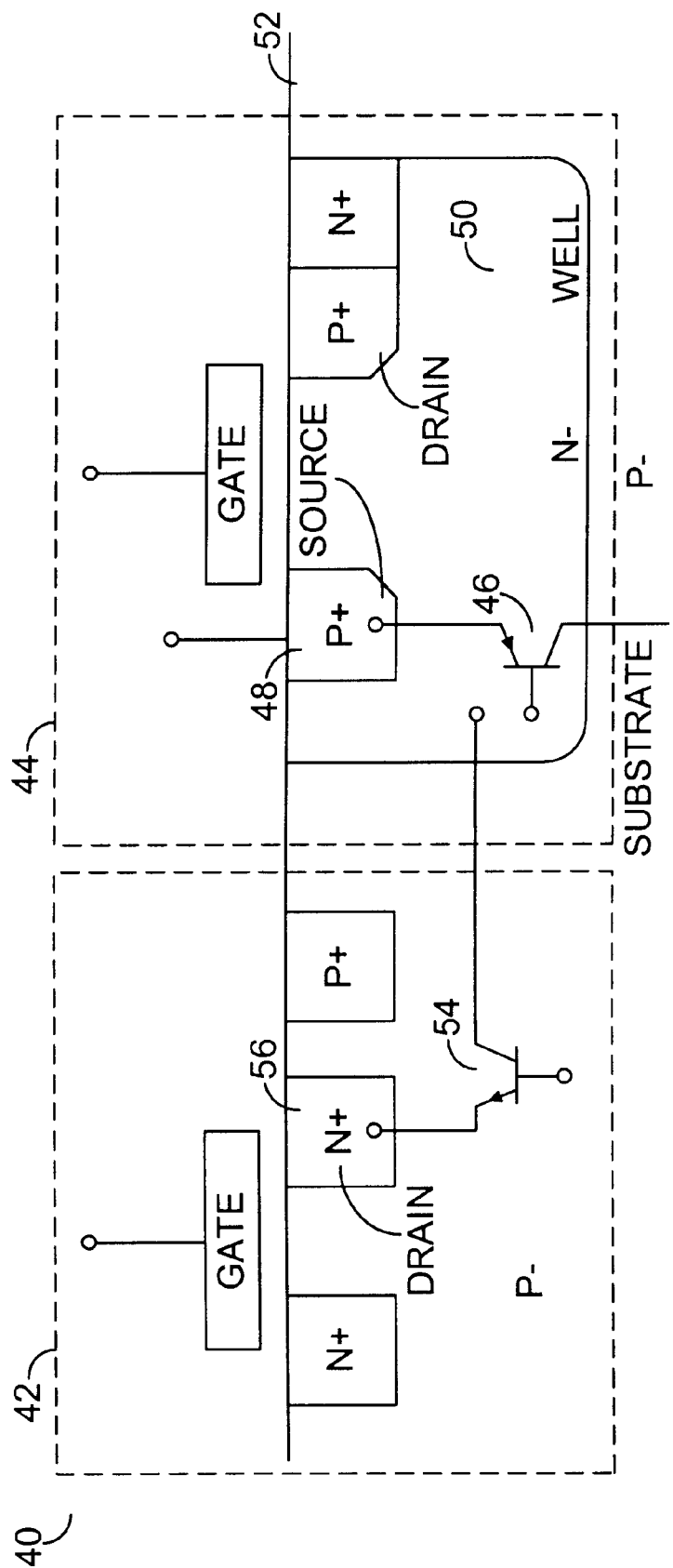
FIG. 2a
(CONVENTIONAL)

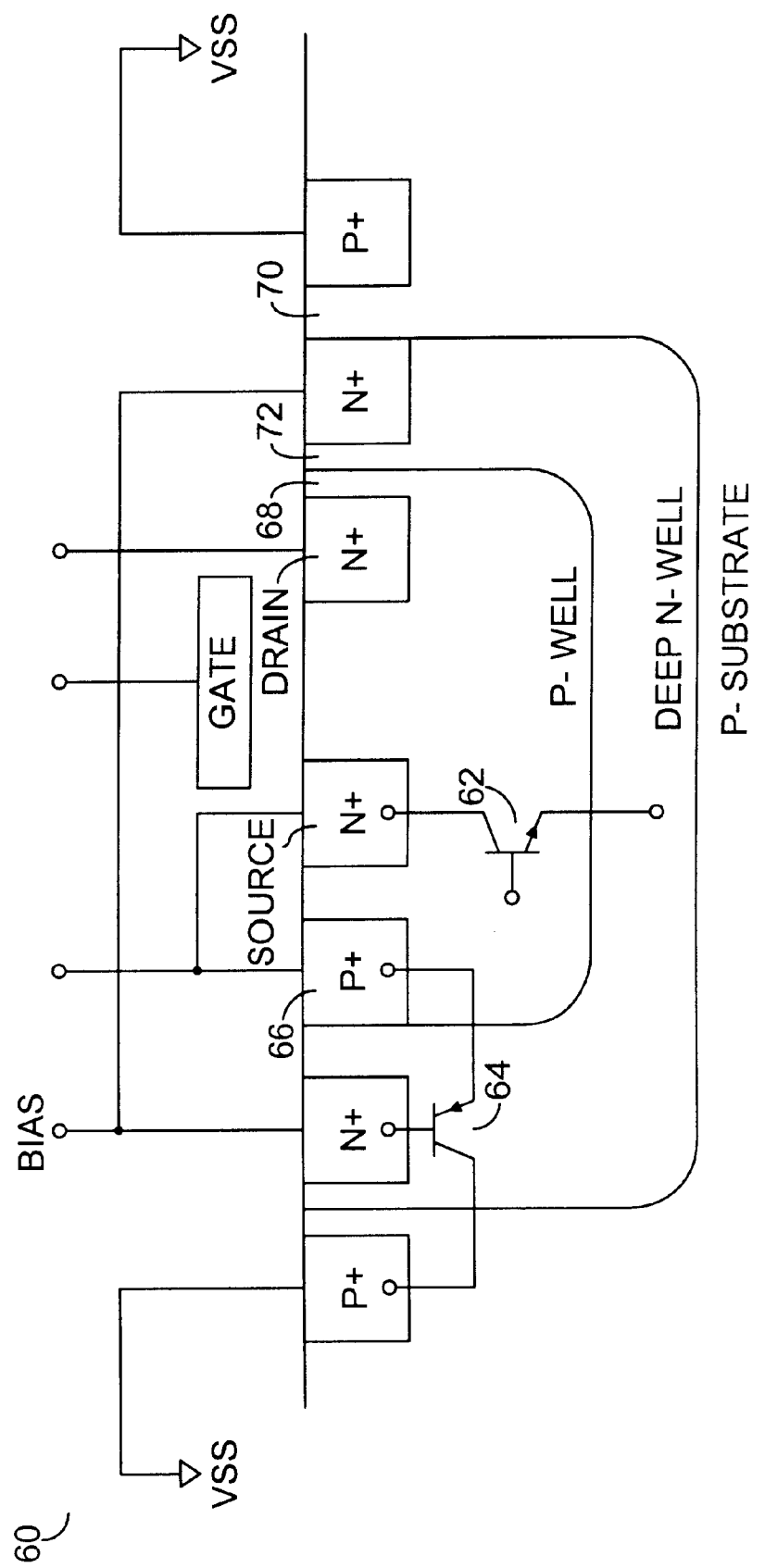
FIG. 2b
(CONVENTIONAL)

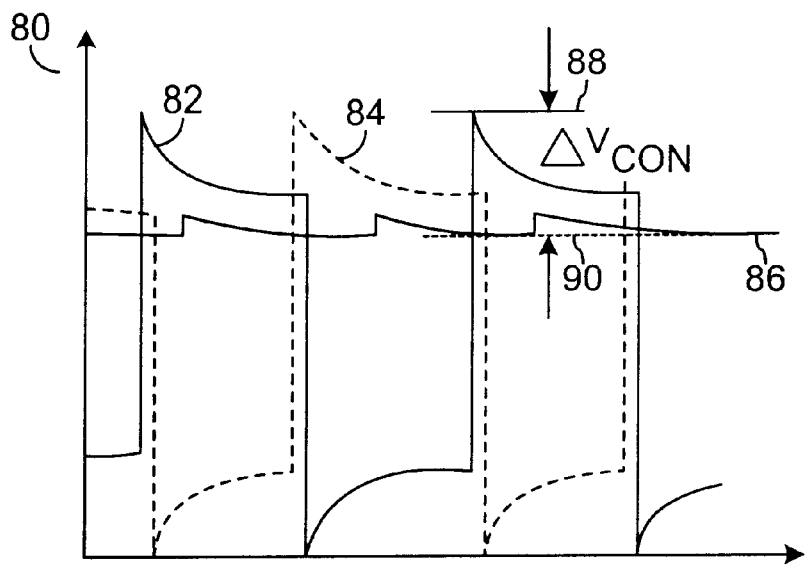
(CONVENTIONAL)
FIG. 3a
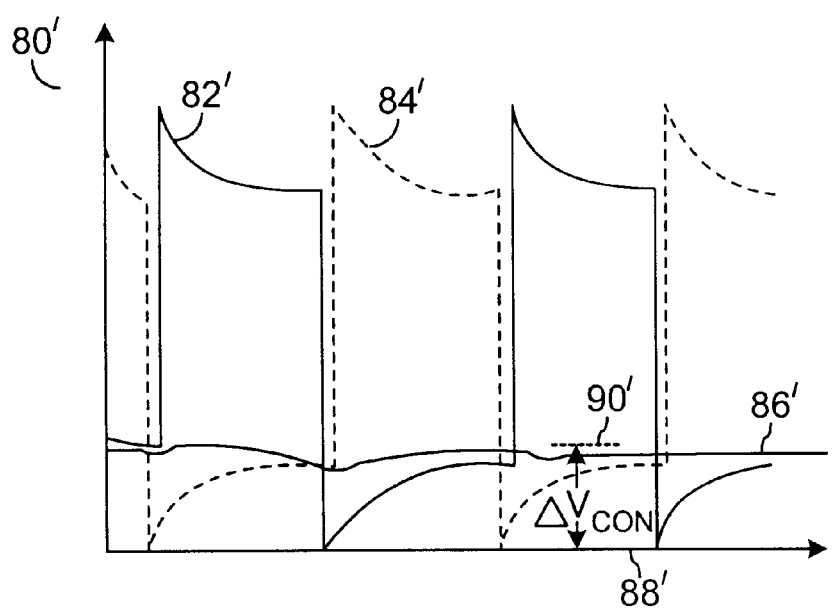
(CONVENTIONAL)
FIG. 3b

SWITCHED WELL TECHNIQUE FOR BIASING CROSS-COUPLED SWITCHES OR DRIVERS

FIELD OF THE INVENTION

The present invention relates to a method and/or architecture for biasing cross-coupled switches or drivers generally and, more particularly, to a method and/or architecture for implementing a switched well technique for biasing cross-coupled switches or drivers.

BACKGROUND OF THE INVENTION

A number of circuits such as charge pumps and some digital logic circuits use cross-coupled switches or drivers as bootstrapped output circuits. Conventional methods for biasing cross-coupled switches or drivers can result in leakage current and/or latch-up problems.

Referring to FIG. 1a, a schematic diagram of a conventional PMOS transistor cross-coupled switch/driver circuit 10 is shown. The circuit 10 has an input 12 and an input 14 that receive complementary clock signals φa and φb, respectively, and an output 16 that presents a signal OUTPUT. The clock signals φa and φb are non-overlapping. A load 32 is connected at the output 16.

The circuit 10 has a PMOS transistor 20, a PMOS transistor 22, a capacitance 24, a capacitance 26, a node 28, and a node 30. The transistors 20 and 22 are connected as cross-coupled switches. The N-wells of the transistors 20 and 22 are connected to the output 16.

The cross-coupled switches 20 and 22 are switched on and off every cycle of the clock signals φa and φb. Since the clock signals φa and φb are non-overlapping, the switches 20 and 22 can not turn on at the same time. When the signal φb is low, the transistor 20 is generally switched on. When the transistor is on, the charge stored at the node 28 is pumped to the load 32. Similarly, when the signal φa is low the transistor 22 is generally switched on. When the transistor 22 is on, the charge stored at the node 30 is pumped to the load 32. When the amplitude of the signals φa and φb is n*Vcc (where n is generally >1), the amplitude of the signal OUTPUT is approximately n*Vcc.

Referring to FIG. 1b, a schematic diagram of another conventional cross-coupled switch/driver circuit 10' is shown. The circuit 10' is implemented similarly to the circuit 10 of FIG. 1a except the circuit 10' is implemented with additional devices 34 and 36 that have a supply voltage Vcc input and are coupled to nodes 28 and 30, respectively. The devices 34 and 36 are switches controlled by the signals SW1 and SW2 that can pump up the nodes 28 and 30 to approximately 2*Vcc when the amplitude of signals φa and φb n*Vcc and n=1. The output voltage OUTPUT can be approximately 2*Vcc.

Referring to FIG. 1c, a diagram of a circuit 10" illustrating an NMOS transistor implementation of the circuit 10 of FIG. 1a is shown. The transistors 20" and 22" are NMOS transistors configured with a P-well and a deep N-well as described below in connection with FIG. 2b. The P-wells of the transistors 20" and 22" are generally biased as low as possible. The P-wells of the transistors 20" and 22" are biased by the signal −OUTPUT. When the amplitude of the signals φa and φb is −Vcc, the amplitude of the signal −OUTPUT can be approximately −Vcc.

Referring to FIG. 1d, a diagram of a circuit 10''' illustrating an NMOS transistor implementation of the circuit 10' of FIG. 1b is shown. The amplitude of the signal −OUTPUT can be approximately −Vcc*2.

Referring to FIG. 2a, a diagram 40 illustrating a cross-section of an NMOS transistor 42 and a neighboring PMOS transistor 44 is shown. The PMOS transistor 44 illustrates the PMOS transistor 20 or 22 of FIGS. 1a and 1b. Because of the structure of the PMOS transistor 44, a vertical (parasitic) PNP transistor 46 is formed by the source 48 (emitter), the N-well 50 (base) and the substrate 52 (collector). When the source to drain voltage of the transistor 44 exceeds the base-emitter voltage ($V_{BE}$) of the vertical PNP transistor 46, the vertical PNP transistor 46 turns on. Similarly, a lateral (parasitic) NPN transistor 54 is formed between the neighboring transistors 42 and 44 by the N-well 50 and the substrate 52 of the transistor 44 and the drain 56 of the transistor 42. When positive feedback occurs between the vertical transistor 46 and the lateral NPN transistor 54, the lateral NPN transistor 54 turns on. The base-emitter voltage $V_{BE}$ can be approximately 0.5 V. When the vertical transistor 46 or the lateral transistor 54 is on, leakage current and/or latch-up can occur through the lateral transistor 54. Leakage current can prevent the signal OUTPUT from reaching the expected value n*Vcc. A conventional method to avoid leakage current and/or latch-up is to bias the N-well 46 such that $V_{source} - V_{Nwell} < V_{BE}$ when $V_{source} >= V_{drain}$.

Referring to FIG. 2b, a diagram 60 illustrating a cross-section of the NMOS transistor 20" or 22" of the FIGS. 1c and 1d is shown. Because of the structure of the twin-welled NMOS transistor 60, a vertical (parasitic) NPN transistor 62 and a lateral (parasitic) PNP transistor 64 are formed. The vertical transistor 62 is formed by the source 66 (emitter), the P-well 68 (base) and the deep N-well 72. The lateral transistor 64 is formed by the source 66 (P-region), the deep N-well 72, and the P-substrate 70. For the transistors 20" and 22" to function properly, the signal BIAS must bias the deep N-well 72 at a voltage greater than the voltage at the P-well 68 and the P-substrate 70. The P-substrate 70 is connected to a ground potential Vss. When the source to drain voltage of the transistor 20" exceeds the base-emitter voltage ($V_{BE}$) of the vertical NPN transistor 62, the vertical NPN transistor 62 turns on. The base-emitter voltage $V_{BE}$ can be approximately 0.5 V. When the vertical transistor 62 is on, leakage current and/or latch-up can occur. When positive feedback occurs between the vertical transistor 62 and the lateral transistor 64, the lateral PNP transistor 64 can latch up. A conventional method to avoid leakage current and/or latch-up is to bias the P-well 68 such that $V_{source} - V_{pwell} < V_{BE}$ when $V_{source} < V_{drain}$.

Referring to FIG. 3a, a diagram 80 illustrating waveforms of the circuit 10 of FIG. 1a is shown. The voltage at the node 28 is illustrated by a waveform 82. The voltage at the node 30 is illustrated by a waveform 84. The signal OUTPUT is illustrated by a waveform 86. Since the N-wells of the transistors 20 and 23 are connected to the output 16, the waveform 86 also illustrates the N-well bias voltages of the transistors 20 and 22. The waveforms 82 and 84 have a peak voltage level 88. The waveform 86 has a minimum voltage level 90. The difference between the voltage level 88 and the voltage level 90 (i.e., ΔVcon) can be in the range of 0.3–1.2 V depending on manufacturing process variations and operating temperature.

When ΔVcon is greater than the base-emitter voltage $V_{BE}$ for the transistor 20 or the transistor 22, a forward biased junction diode between the source and the drain of the transistor 20 or the transistor 22 can turn on causing leakage current and/or latch-up. Voltage drooping at the nodes 28 and 30 can cause a large ΔVcon. A conventional approach to reduce voltage drooping at the nodes 28 and 30 is to implement large values for the capacitances 24 and 26.

Large values for the capacitances 24 and 26 can reduce ΔVcon, but will not eliminate the leakage current. Large values for the capacitances 24 and 26 can also require significant die area.

Referring to FIG. 3b, a diagram 80' illustrating waveforms of the circuits 10''' and 10'' of FIG. 1c and 1d, respectively, is shown. The waveform 86' illustrates the P-well bias voltages of the transistors 20'' and 22''. The waveforms 82' and 84' cross the waveform 86' at low voltage levels. The waveforms 82' and 84' have a minimum voltage level 88'. The waveform 86' has a peak voltage level 90'. The difference between the voltage level 88' and the voltage level 90' is ΔVcon.

Another conventional approach for providing the well-bias voltage to the transistors 20 and 22 is to duplicate the circuit 10 of FIG. 1a without the load 32. The output of the duplicate circuit 10 is used to bias the N-wells of the transistors 20 and 22. However, duplicating the circuit 10 has the disadvantage of doubling the required die area.

A method and/or architecture that reduces leakage current and/or latch-up and does not use significant die area would be desirable.

SUMMARY OF THE INVENTION

The present invention concerns an apparatus comprising a circuit that may be configured to generate an output in response to a first and a second input. The circuit may be automatically biased in response to the first and second inputs.

The objects, features and advantages of the present invention include providing a method and/or architecture for switched well biasing for cross-coupled or bootstrapped switches and/or drivers that may (i) require little extra die area, (ii) reduce transistor body effect, (iii) bias a PMOS transistor N-well to a higher voltage potential of two inputs, (iv) bias an NMOS transistor P-well to a lower voltage potential of two inputs, (v) prevent junction diode forward biasing, (vi) prevent leakage current, (vii) prevent latch-up, and/or (viii) be easily implemented.

BRIEF DESCRIPTION OF THE DRAWINGS

These and other objects, features and advantages of the present invention will be apparent from the following detailed description and the appended claims and drawings in which:

FIGS. 1(a–d) are schematic diagrams illustrating conventional biasing methods for a cross-coupled switch circuit;

FIG. 2a is a diagram illustrating a cross-section of a PMOS transistor of FIGS. 1a and 1b;

FIG. 2b is a diagram illustrating a cross-section of an NMOS transistor of FIGS. 1c and 1d;

FIG. 3a is a diagram illustrating example waveforms of the circuit of FIG. 1a;

FIG. 3b is a diagram illustrating example waveforms of the circuit of FIGS. 1c and 1d;

DETAILED DESCRIPTION OF THE PREFERRED EMBODIMENTS

Figure 4:
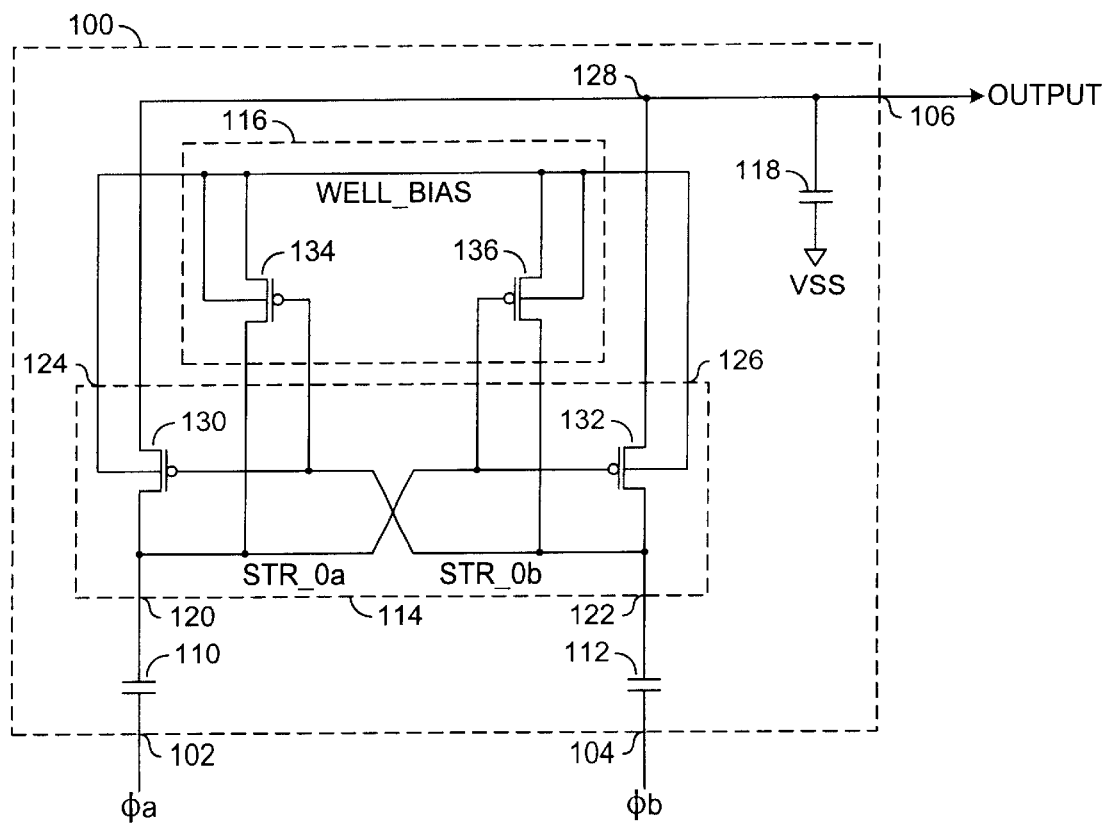
FIG. 4 is a schematic diagram illustrating a preferred embodiment of the present invention.

Referring to FIG. 4, a schematic diagram of a circuit 100 illustrating a preferred embodiment of the present invention is shown. The circuit 100 may be, in one example, a switched-well biased cross-coupled switch and/or driver circuit. The circuit 100 may have an input 102 that may receive a signal (e.g., φa), an input 104 that may receive a signal (e.g., φb), and an output 106 that may present a signal (e.g., OUTPUT). The signals φa and φb may be non-overlapping complementary clock signals. In one example, the signals φa and φb may have an amplitude equal to a supply voltage (e.g., Vcc). In another example, the signals φa and φb may have an amplitude of approximately 2*Vcc. The signal OUTPUT may be, for example, a voltage signal with a voltage level that may be higher than a supply voltage.

The circuit 100 may comprise a device 110, a device 112, a block (or circuit) 114, a block (or circuit) 116, and a load 118. The devices 110 and 112 may be, in one example, capacitors. Alternatively, the devices 110 and 112 may be transistors configured as capacitors. The block (or circuit) 114 may be a cross-coupled switch or driver circuit. The block (or circuit) 116 may be a bias circuit. The load 118 may be implemented, in one example as a capacitance.

The signal φa may be presented to a first terminal of the device 110. A signal (e.g., STR_φa) may be presented at a second terminal of the device 110. The signal STR_φa may be generated in response to the signal φa. The signal φb may be presented to a first terminal of the device 112. A signal (e.g., STR_φb) may be present at a second terminal of the device 112. The signal STR_φb may be generated in response to the signal φb. The signals STR_φa and STR_φb may comprise a quantity of charge.

The block (or circuit) 114 may have an input 120 that may receive the signal STR_φa, an input 122 that may receive the signal STR_φb, inputs 124 and 126 that may receive a signal (e.g., WELL_BIAS), and an output 128 that may present the signal OUTPUT. The signal OUTPUT may be presented to a first terminal of the load 118. A second terminal of the load 118 may be connected to a voltage supply ground (e.g., Vss). The signal WELL_BIAS may be used as a well biasing signal. The block (or circuit) 114 may be configured to generate the signal OUTPUT in response to the signals STR_φa, STR_φb, and WELL_BIAS.

The block (or circuit) 114 may comprise a transistor 130 and a transistor 132. The transistors 130 and 132 may be implemented as one or more PMOS transistors. The transistors 130 and 132 may be configured as cross-coupled switches or drivers. The signal STR_φa may be presented to a source of the transistor 130 and a gate of the transistor 132. The signal STR_φb may be presented to a gate of the transistor 130 and a source of the transistor 132. A drain of the transistor 130 may be connected to a drain of the transistor 132. The signal OUTPUT may be presented at the node 128 formed by the connection of the drains of the transistors 130 and 132. The signal WELL_BIAS may be presented to an N-well of the transistor 130 and the transistor 132.

The block (or circuit) 116 may be configured to (i) receive the signals STR_φa and STR_φb and (ii) generate the signal WELL_BIAS in response to the signals STR_φa and STR_φb. The block (or circuit) 116 may comprise a transistor 134 and a transistor 136. The transistors 134 and 136 may be implemented as one or more PMOS transistors. The transistors 134 and 136 may be cross-coupled similarly to the transistors 130 and 132. The signal STR_φa may be presented to a source of the transistor 134 and a gate of the transistor 136. The signal STR_φb may be presented to a gate of the transistor 134 and a source of the transistor 136.

A drain and an N-well of the transistor 134 may be connected to a drain and an N-well of the transistor 136. The signal WELL_BIAS may be presented at a node formed by the connection of the drains and N-wells of the transistors 134 and 136.

The transistors 134 and 136 are generally sized smaller than the transistors 130 and 132. In a preferred embodiment, the transistors 134 and 136 may be sized approximately 20%–40% of the size of the transistors 130 and 132. In another preferred embodiment, the transistors 134 and 136 may be sized one-fourth the size of the transistors 130 and 132. However, other transistor sizing may be implemented accordingly to meet the design criteria of a particular application.

During an example operation of the circuit 100, the transistors 130, 132, 134 and 136 may be switched on and off every cycle of the clock signals φa and φb. When the signal φb is low, the transistors 130 and 134 may be turned ON and the transistors 132 and 136 may be turned OFF. When the transistors 130 and 134 are turned ON, the signal STR_φa may be presented as the signal OUTPUT and the signal WELL_BIAS. Similarly, when the signal φa is low, the transistors 132 and 136 may be turned ON and the transistors 130 and 134 may be turned OFF. When the transistors 132 and 136 are turned ON, the signal STR_φb may be presented as the signal OUTPUT and the signal WELL_BIAS.

The present invention may provide an N-well bias voltage that closely tracks the voltage level of an input signal. In general, the present invention may assure that the N-wells of the transistors 130, 132, 134, and 136 are biased in response to the signal STR_φa or the signal STR_φb having the higher voltage level. The present invention may prevent excessive forward biasing of source/drain junction diodes in the transistors 130, 132, 134, and 136. Preventing the junction diodes from being forward biased may prevent leakage current and/or latch-up. The present invention may reduce body effect (e.g., smaller $V_{TP}$) of the transistors 130, 132, 134, and 136. The transistors 134 and 136 may be implemented using minimal additional die area.

Figure 5:
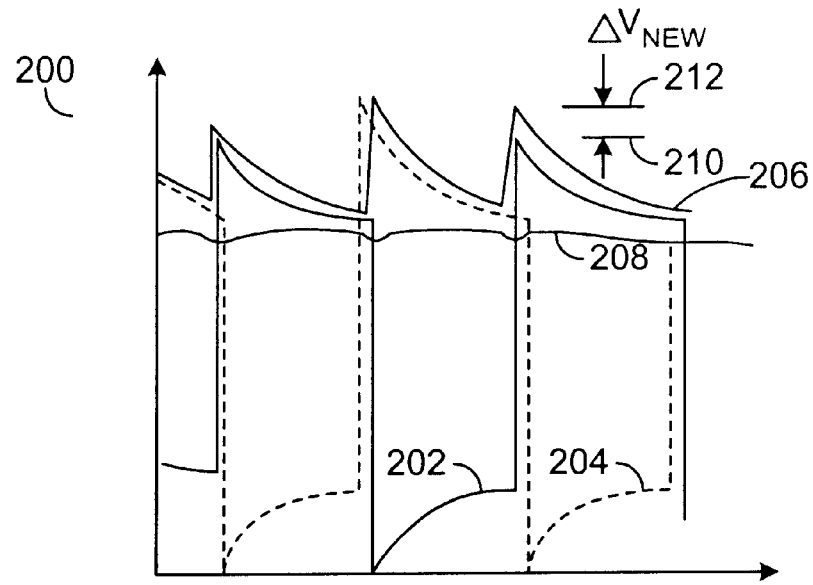
FIG. 5 is a diagram illustrating example waveforms of the circuit of FIG. 4.

Referring to FIG. 5, a diagram 200 illustrating example waveforms of the circuit 100 is shown. A waveform 202 may be a voltage waveform of the signal STR_φa. A waveform 204 may be a voltage waveform of the signal STR_φb. A waveform 206 may be a voltage waveform of the signal WELL_BIAS. A waveform 208 may be a voltage waveform of the signal OUTPUT. The waveforms 202 and 204 may have a peak voltage level 210. The waveform 206 may have a peak voltage level 212. A difference between the level 210 and the level 212 (e.g., ΔVnew) may be less than 50 mV. The difference between the waveforms 202 and 204 and the waveform 206 (e.g., the voltage ΔVnew) may be constant. The voltage ΔVnew may be less than the base-emitter voltage $V_{BE}$ for the transistors 130, 132, 134, and 136.

Figure 6:
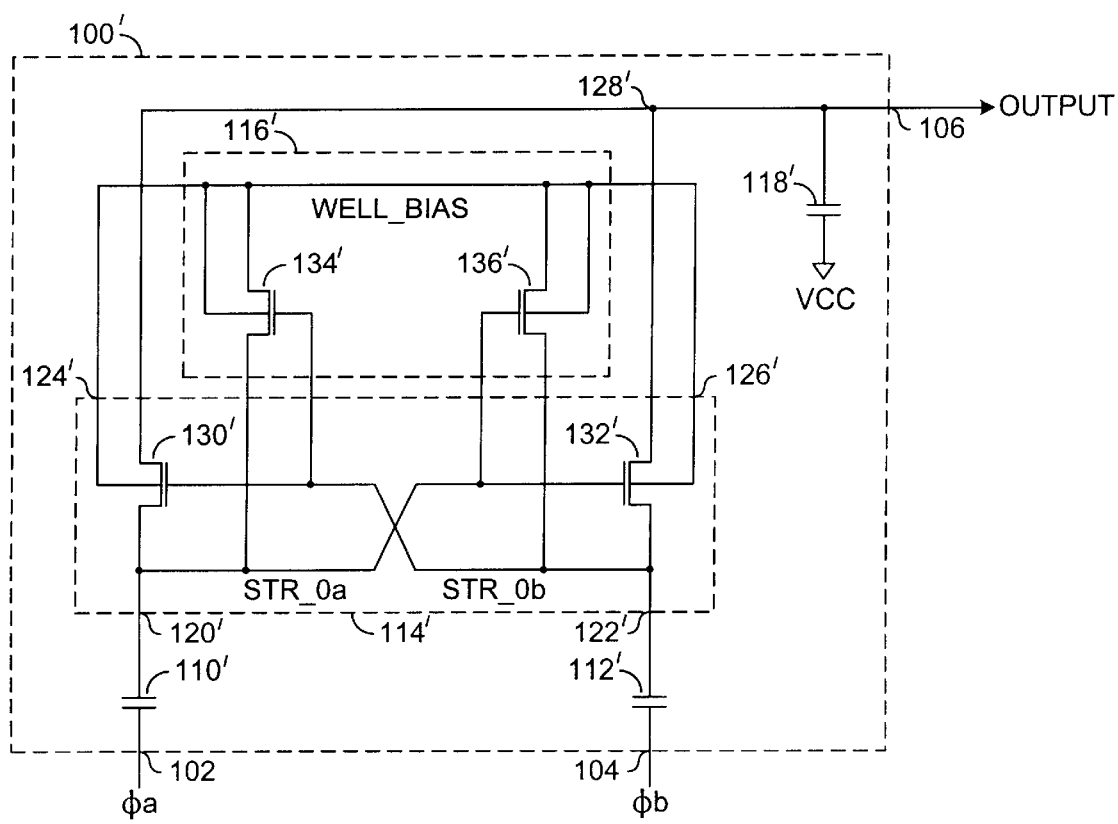
FIG. 6 is a schematic diagram illustrating an alternative embodiment of the present invention.

Referring to FIG. 6, a circuit 100' illustrating an alternative embodiment of the present invention is shown. The circuit 100' may be implemented similarly to the circuit 100. However, the circuit 100' may be implemented using NMOS transistors 130', 132', 134', and 136' instead of the PMOS transistors 130, 132, 134, and 136 used in the circuit 100. The signals STR_φa and STR_φb may have an amplitude less than Vss (e.g., −Vcc*2). The NMOS transistors 130', 132', 134', and 136' may be configured with two wells (e.g., a P-well and a deep N-well as illustrated in FIG. 2a). In one example, the circuit 100' may bias the P-wells of the transistors 130', 132', 134', and 136' in response to the signal STR_φa or the signal STR_φb having the lowest voltage level. Generally, the P-substrate 70 is connected to the ground potential Vss. The deep N-well may be biased at 0 V. (e.g., ground potential Vss) or at a positive voltage potential. The P-well may be biased such that $V_{deep\ N-well} > V_{P-substrate}$ and $V_{deep\ N-well} > V_{P-well}$. In one example, when $V_{P-well} = -Vcc$, $V_{deep\ N-well}$ may be in the range 0 V. to 0.5 V. In another example, when $V_{P-well} = 2*Vcc$, $V_{deep\ N-well}$ may be ΔV +2*Vcc where ΔV>0.5 V.

Figure 7:
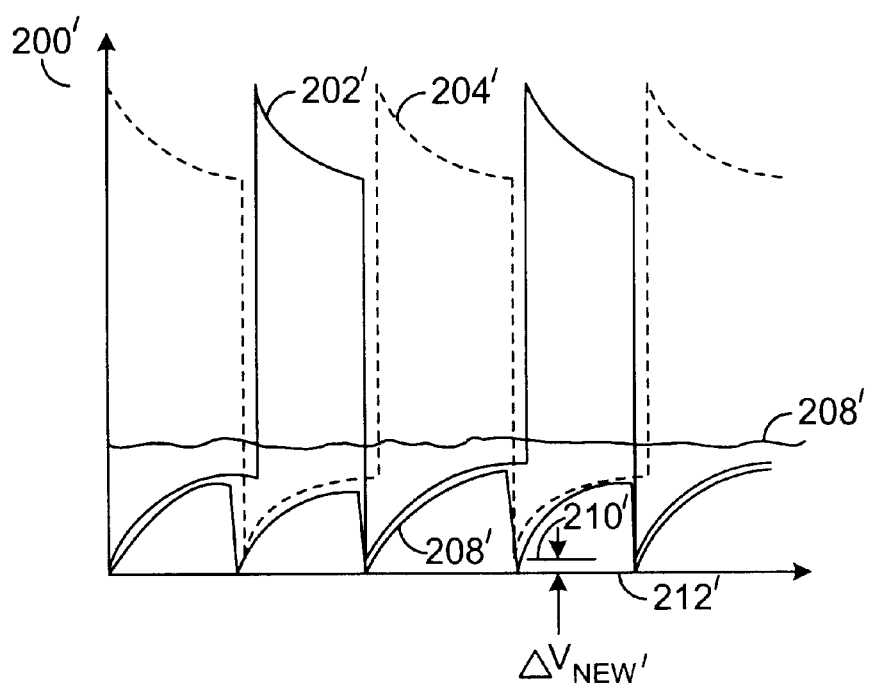
FIG. 7 is a diagram illustrating an example of waveforms of the circuit of FIG. 6.

Referring to FIG. 7, a diagram 200' illustrating example waveforms of the circuit 100' is shown. A difference voltage (e.g., ΔVnew') may be similar to the difference voltage ΔVnew. The difference voltage ΔVnew' may be less than the base-emitter voltage $V_{BE}$ of a vertical (parasitic) NPN transistor for the transistors 130', 132', 134', and 136'.

While the invention has been particularly shown and described with reference to the preferred embodiments thereof, it will be understood by those skilled in the art that various changes in form and details may be made without departing from the spirit and scope of the invention.

What is claimed is:

1. An apparatus comprising:
   a first circuit configured to generate an output in response to a first and a second input, wherein said first circuit comprises a plurality of first cross-coupled transistors each having a well configured to receive a bias signal; and
   a second circuit configured to generate said bias signal in response to a greater magnitude of said first and second inputs.

2. The apparatus according to claim 1, wherein (i) said first circuit comprises cross-coupled switches or drivers that are switched-well biased in response to voltage levels at said first and second inputs and (ii) said second circuit comprises a plurality of second cross-coupled transistors.

3. The apparatus according to claim 2, wherein each of said second cross-coupled transistors further comprises a well coupled to said wells of said first cross-coupled transistors.

4. The apparatus according to claim 1, wherein said first and second inputs comprise non-overlapping complementary clock signals.

5. The apparatus according to claim 2, wherein said first and second cross-coupled transistors comprise metal-oxide-silicon (MOS) transistors.

6. The apparatus according to claim 5, wherein said first and second cross-coupled transistors are PMOS transistors.

7. The apparatus according to claim 6, wherein said bias signal is generated in response to the first or second input having a higher voltage level.

8. The apparatus according to claim 5, wherein said first and second cross-coupled transistors are NMOS transistors.

9. The apparatus according to claim 8, wherein said bias signal is generated in response to the first or second input having a lower voltage level.

10. The apparatus according to claim 5, wherein said plurality of second cross-coupled transistors are sized in the range of 20% to 40% of the size of said plurality of first cross-coupled transistors.

11. The apparatus according to claim 5, wherein said plurality of second cross-coupled transistors are one-fourth the size of said plurality of first cross-coupled transistors.

12. The apparatus according to claim 1, wherein said first and second inputs are capacitively coupled to said first and second circuits.

13. The apparatus according to claim 2, wherein:
   said first input is coupled to (a) a source of (i) a first of said first cross-coupled transistors and (ii) a first of said second cross-coupled transistors and (b) a gate of (i) a second of said first cross-coupled transistors and (ii) a second of said second cross-coupled transistors;

said second input is coupled to (a) a gate of (i) said first of said first cross-coupled transistors and (ii) said first of said second cross-coupled transistors and (b) a source of (i) said second of said first cross-coupled transistors and (ii) said second of said second cross-coupled transistors;

said well of said first of said first cross-coupled transistors, a drain and a well of said second of said second cross-coupled transistors, a drain and a well of said first of said second cross-coupled transistors, and said well of said second of said first cross-coupled transistors are connected together; and a drain of said first of said first cross-coupled transistors and a drain of said second of said first cross-coupled transistors are connected together and form a node at which said output is presented.

14. The apparatus according to claim 13, further comprising a capacitor coupled between said output and a voltage supply ground.

15. The apparatus according to claim 13, wherein said inputs are coupled via capacitors.

16. The apparatus according to claim 13, wherein said inputs are coupled via transistors configured as capacitors.

17. The apparatus according to claim 13 wherein said second cross-coupled transistors are 20–40% as large as said first cross-coupled transistors.

18. An apparatus comprising:

means for generating an output in response to a first input and a second input, wherein said generating means comprises a plurality of cross-coupled transistors each having a well configured to receive a bias signal; and means for generating said bias signal in response to a greater magnitude of voltage levels of said first and said second inputs.

19. A method for biasing cross-coupled switches or drivers comprising the steps of:

(A) detecting a voltage level at a first and a second input to said cross-coupled switches or drivers; and (B) switching a bias of one or more wells of said cross-coupled switches or drivers in response to a greater magnitude of the voltage levels detected in step A.

20. The method according to claim 19, wherein step B comprises the sub-steps of:

(B-1) when said wells are N-wells of one or more PMOS transistors, biasing said N-wells with the higher voltage level of said first or second input; and (B-2) when said wells are P-wells of one or more NMOS transistors, biasing said P-wells with the lower voltage level of said first or second input.

* * * * *